Aug. 19, 1924.
P. G. CHAYER
1,505,863
APPARATUS FOR REMOVING SNOW OR THE LIKE
Filed March 19, 1921   3 Sheets-Sheet 1
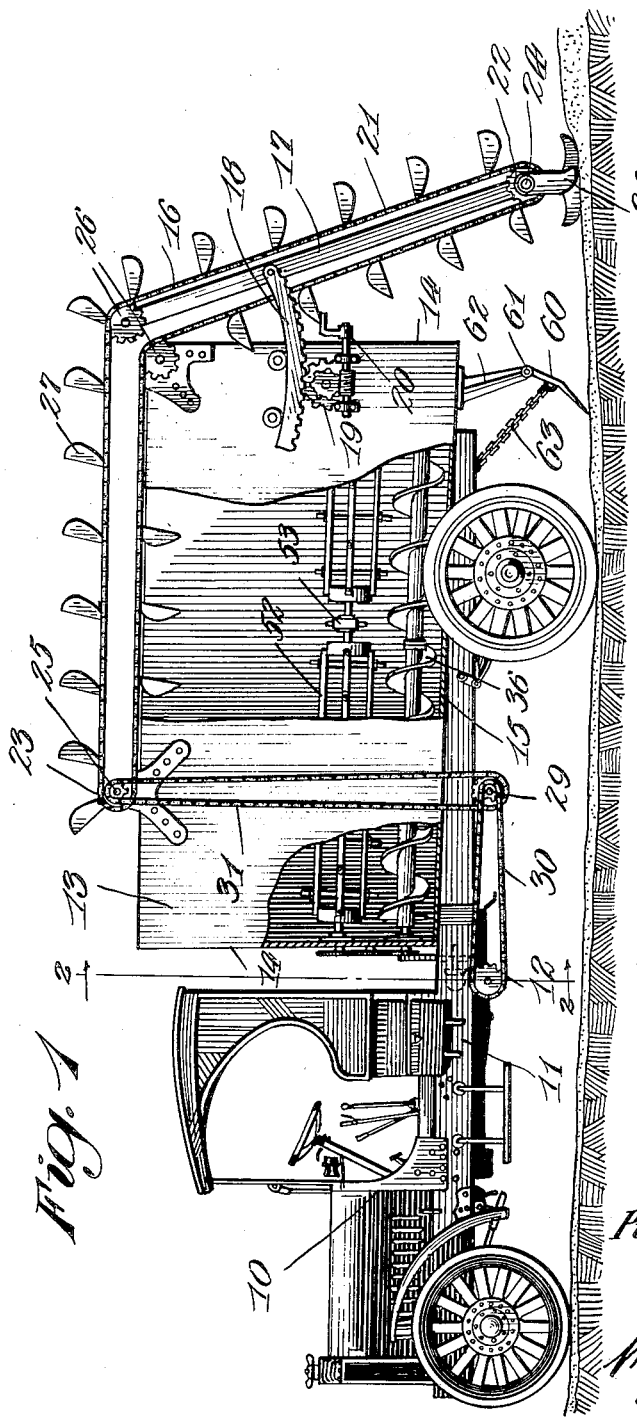
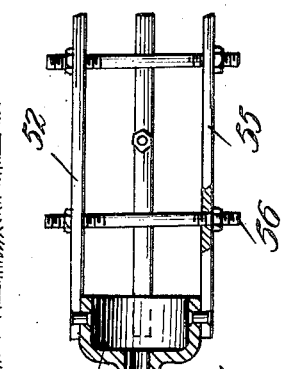
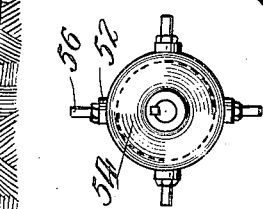
Inventor:
Pierre Gaspard Chayer
By
William Clinton
Attorney Aug. 19, 1924.
P. G. CHAYER
APPARATUS FOR REMOVING SNOW OR THE LIKE
Filed March 19, 1921   3 Sheets-Sheet 3
1,505,863
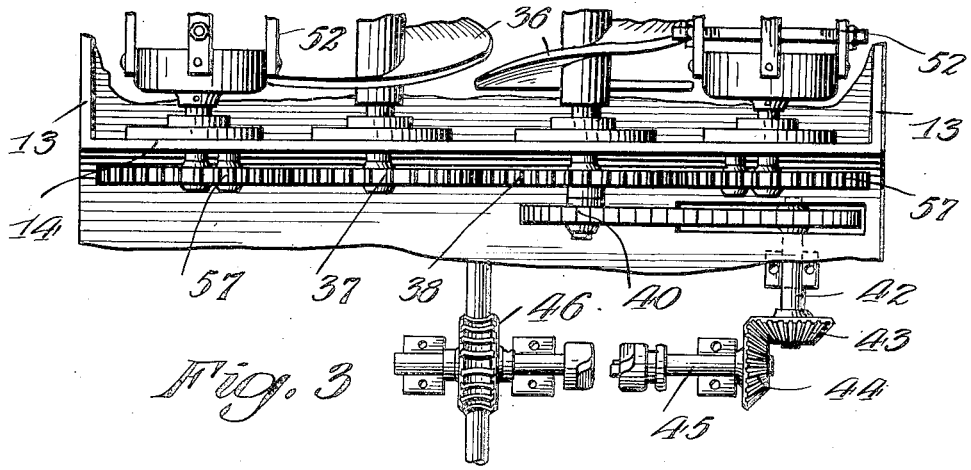
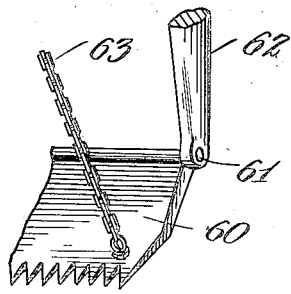
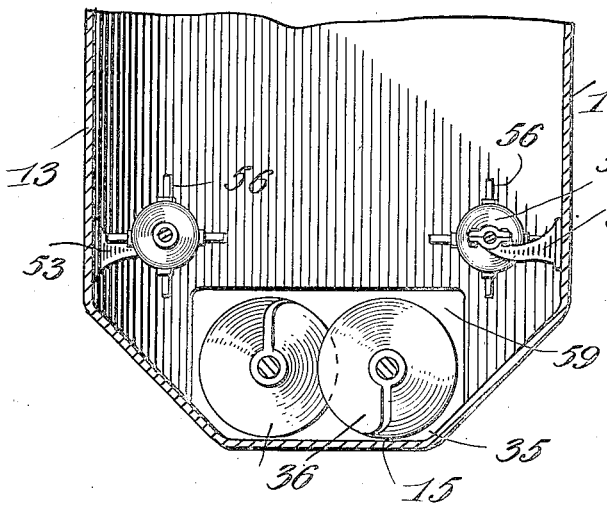
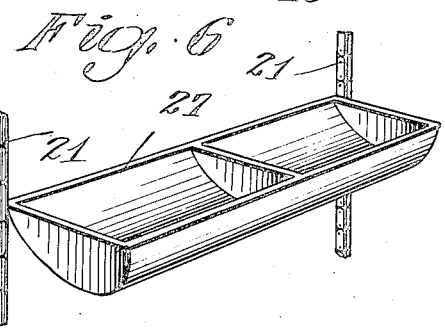
Inventor:
Pierre Gaspard Chayer
By
William C. Linton
Attorney Patented Aug. 19, 1924.

1,505,863

UNITED STATES PATENT OFFICE.

PIERRE GASPARD CHAYER, OF LIMOILOU, QUEBEC, CANADA, ASSIGNOR OF ONE-HALF TO ALBERT LAPOINTE, OF LIMOILOU, QUEBEC, CANADA.

APPARATUS FOR REMOVING SNOW OR THE LIKE.

Application filed March 19, 1921. Serial No. 453,684.

*To all whom it may concern:*

Be it known that I, PIERRE GASPARD CHAYER, a subject of the King of Great Britain, residing at Limoilou, Province of Quebec, Canada, have invented certain new and useful Improvements in Apparatus for Removing Snow or the like; and I do hereby declare that the following is a full, clear, and exact description of the invention, such as will enable others skilled in the art to which it appertains to make and use the same.

The present invention relates to new and useful improvements in conveying apparatus for removing piles of snow, earth or the like.

The primary object of the invention is the provision of a conveying apparatus particularly designed for use in removing piles of snow, but so constructed that it can be adapted for other purposes such as removing and loading sand, coal, rocks, and, in fact, any other objects which may be desired.

Another object of the invention is the provision of a machine of the above specified type which comprises a conveyor for conveying the snow or the like and dumping it into the truck body which forms a part of the machine.

Another object of the invention is the provision of means for adjusting the conveyor to any desired pitch or height.

Still another object of the invention is the provision of agitating means within the truck body for preventing the snow or the like from packing into a solid mass in the bottom thereof and thus preventing its ready removal.

A further object of the invention is the provision of a machine of the character above specified comprising a body portion with means for conveying snow or the like and depositing it therein and likewise screw and discharging elements for discharging the snow or the like from the said body, as desired.

A further object of the invention is the provision of a machine such as above referred to, particularly adapted for the purposes of removing snow or the like from piles in the streets, together with adjustable means for scraping the streets as the machine is conveyed from one locality to another.

A still further object of the invention is the provision of a machine for removing snow or the like, which will be comparatively simple and inexpensive to manufacture, reliable and efficient in use, and readily operated.

With the above and other objects in view, the present invention resides in the novel features of construction, formations, combinations, and arrangements of parts to be hereinafter more fully described, claimed, and illustrated in the accompanying drawings forming a part of the present application, and in which:

Figure 1 is a side elevation of my improved machine, shown applied to a truck with parts broken away to show the interior thereof;

Figure 3 is a plan view of the power transmission mechanism;

Figure 4 is a detail transverse sectional view taken through the lower portion of the body;

Figure 5 is a detail perspective view of one edge of the scraper;

Figure 6 is a detail perspective view of one of the conveyor buckets;

Figure 7 is a detail end view of one of the agitating drums; and,

Figure 8 is a detail longitudinal sectional view of one end of one of the said drums.

Figure 2:
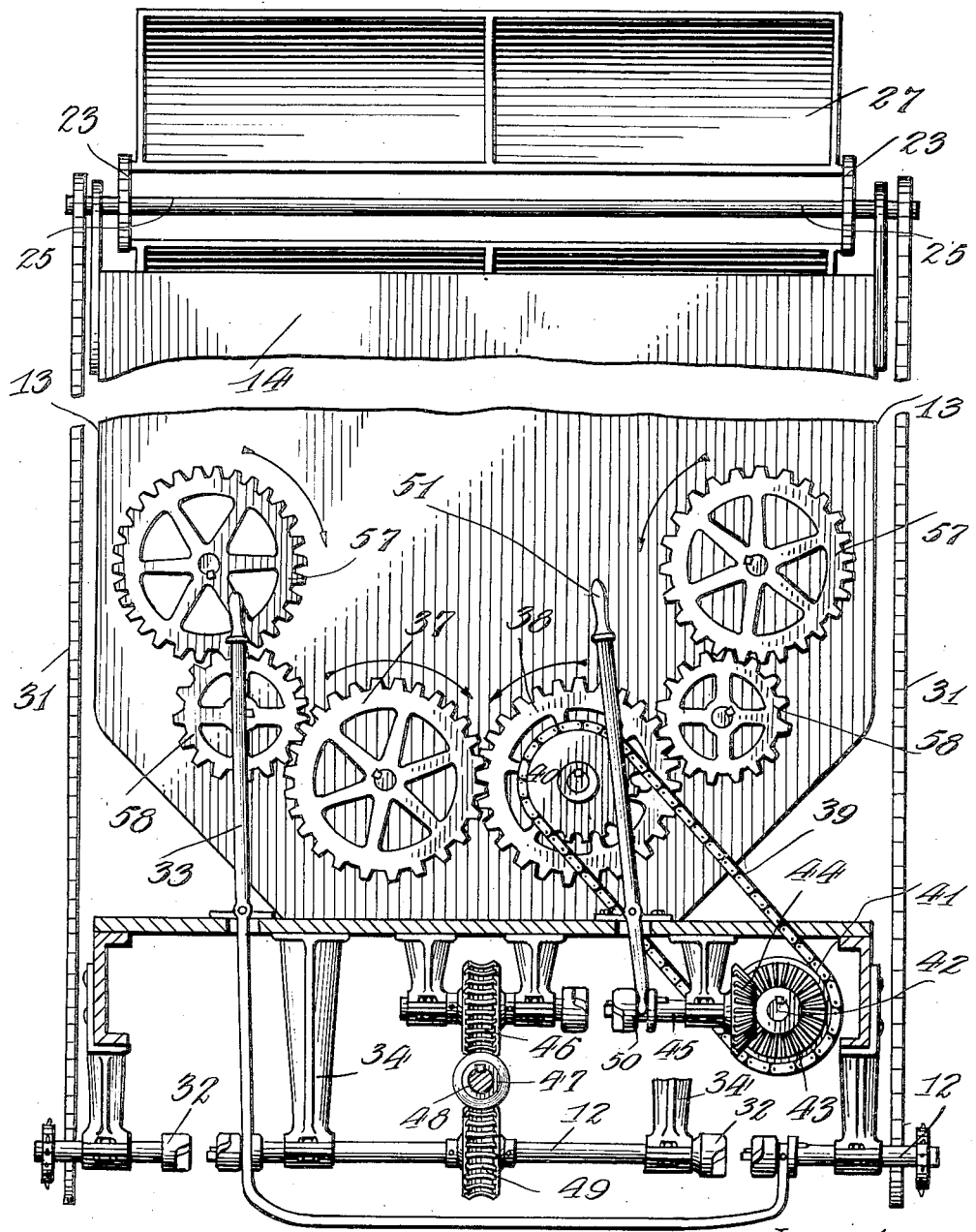
Figure 2 is a transverse sectional view on the line 2—2 of Figure 1.

Referring now to the accompanying drawings by corresponding characters of reference throughout the several views, the numeral 10 designates in general the chassis of a motor truck including the frame 11 below which is mounted a transversely extending drive shaft 12, the power to which is derived from the motor of the truck (not shown).

A substantially rectangular shaped body portion including opposite side members 13, end members 14, and bottom 15 is mounted upon the frame 11, while supported thereabove is a conveyor 16, the rear extremity of which is movably connected by means of bars 17 and a rack 18 which meshes with the gear 19 which is rotated through the instrumentality of the operating crank 20 in such manner that the said lower end of the conveyor may be elevated or the pitch thereof changed as desired.

The conveyor 16 comprises opposite side chains 21, the ends of which pass over the sprockets 22 and 23 mounted on shafts 24 and 25 upon opposite sides of the body 13. The intermediate portions of the chains 21 pass over the sprockets 26 which support the upper extension of the conveyor in substantially horizontal position.

The chains 21 are connected by suitable scoops or buckets 27 which are adapted to scoop up the snow or other refuse or the like to be removed, and deposit it in the body 13 above referred to.

The lower end of the conveyor as shown is supported by suitable runners 28 which ride over the snow and permit of the necessary and desired movement of the machine.

Power is imparted to the shaft 25 and sprockets 23 of the conveyor through the instrumentality of the counter-shaft 29 which receives its power from the drive shaft 12 through the chain 30. A similar chain 31 transmits power from the counter-shaft 29 to the said shaft 25 of the conveyor and thus provides a means for setting the conveyor in motion.

The drive shaft 12 is provided with suitable clutch elements shown at 32, actuated through the instrumentality of the lever 33 for driving the counter-shaft 29 only when desired.

The drive shaft 12 above referred to is mounted in suitable brackets 34 secured to the underside of the truck.

The underside of the body 13 is depressed, producing a trough 35 in which are mounted a pair of screw elements 36 for a purpose to be later explained. The forward ends of these screw elements 36 carry gears 37 and 38 which mesh and are driven in reverse directions by the sprocket chain 39 which passes over the sprockets 40 and 41 on one of the screw elements 36 and the shaft 42 respectively.

The shaft 42 carries a bevelled pinion 43 which meshes with a bevelled pinion 44 secured to a shaft 45 driven by means of a worm wheel 46 which meshes with a worm 47 secured to a longitudinal shaft 48 which likewise receives its power through the worm wheel 49 secured centrally to the drive shaft 12.

A suitable clutch is shown at 50 and provides the means for setting the screw elements 36 in motion when desired. This clutch 50 is operated through a suitable lever shown at 51.

Agitating drums 52 are mounted in suitable brackets 53 secured to opposite sides of the body portion and each of said frames comprise heads 54 connected by strips 55 from which project the teeth 56. These drums 52 are suitably mounted within the body portion upon opposite sides thereof and have secured to their forward ends gear wheels 57 which mesh with the idlers 58, and as these idlers are in mesh with the before mentioned gears 37 and 38, power will be imparted to the agitating drums for stirring up the contents of the body 13 and preventing the same from forming a solid mass in the bottom thereof.

When desired, the contents of the said body portion may be discharged through the opening 59 at the rear end of said body portion.

As shown in Figure 1, a suitable scraper 60 is pivoted as at 61 to the lower ends of the hanger 62 and is adjustably connected to the frame of the truck by means of a chain 63 in order that the machine, when desired, can be used for scraping the snow or the like from the streets.

In operation, the machine is backed up to a pile of snow or the like and the conveyor set in operation by means of the lever 53. The snow will be picked up in the scoops or buckets of the conveyor and deposited within the body portion. The machine is then transported to the desired spot where the contents are to be dumped, and the agitating drums 52 and screw elements 36 are next set in motion which discharges the snow or other contents of the body 13 through the opening 59 formed in the rear end thereof.

When it is desired to use the machine for the purposes of removing coal, sand, dirt or the like, the runners 28 may be dispensed with and suitable wheels (not shown) substituted therefor.

From the foregoing description, taken in connection with the accompanying drawings, it will be manifest that a machine for removing snow, piles of coal, loose earth, sand and the like is provided, which will fulfil all of the necessary requirements of such an apparatus, and it should be understood in this connection, that various minor changes in the specific details of construction can be resorted to within the scope of the appended claim, without departing from the spirit or sacrificing any of the advantages of the invention.

Having thus fully described the invention, what I claim as new and desire to protect by Letters Patent is:—

A machine of the character described in combination with a truck, a body mounted thereon, a conveyor carried by said body at the rear end thereof for conveying snow or the like thereto, means for operating said conveyor, agitating drums mounted longitudinally of the body at the opposite sides thereof for rotation, screw elements mounted between and below the agitating means, means for driving the agitating means and the screw elements, and means for supporting the lower end of the conveyor.

In witness whereof I have hereunto set my hand.

PIERRE GASPARD CHAYER.